United States Patent
Barthel et al.

(10) Patent No.: US 7,808,917 B2
(45) Date of Patent: Oct. 5, 2010

(54) METHOD AND SYSTEM FOR TRANSMITTING TELEGRAMS

(75) Inventors: Herbert Barthel, Herzogenaurach (DE); Ingmar Binder, Ursensollen (DE); Heiner Fuchs, Erlangen (DE); Rainer Mattes, Trittenheim (DE); Alexander Pfister, Eggolsheim (DE); Wolfgang Schmauss, Rückersdorf (DE); Edgar Sigwart, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 633 days.

(21) Appl. No.: 11/330,525

(22) Filed: Jan. 12, 2006

(65) Prior Publication Data

US 2006/0187932 A1    Aug. 24, 2006

(30) Foreign Application Priority Data

Jan. 28, 2005    (EP)    ................................. 05001799

(51) Int. Cl.
| | |
|---|---|
| *H04J 1/16* | (2006.01) |
| *H04J 3/14* | (2006.01) |
| *H04J 3/06* | (2006.01) |
| *H04L 12/42* | (2006.01) |
| *G06F 11/00* | (2006.01) |

(52) U.S. Cl. .................. 370/242; 370/252; 370/453; 370/503; 714/15; 714/49; 714/798

(58) Field of Classification Search .................. 370/394
See application file for complete search history.

(56) References Cited

U.S. PATENT DOCUMENTS

| | | | | |
|---|---|---|---|---|
| 6,038,694 A | * | 3/2000 | Swallow | ..................... 714/781 |
| 6,411,987 B1 | * | 6/2002 | Steger et al. | ................. 709/203 |
| 6,487,689 B1 | * | 11/2002 | Chuah | ......................... 714/748 |
| 6,574,770 B1 | * | 6/2003 | Daudelin | ..................... 714/776 |

(Continued)

FOREIGN PATENT DOCUMENTS

DE    198 40 562 A1    3/2000

(Continued)

OTHER PUBLICATIONS

S. Casner et al., RFC-2508: Compressing IP/UDP/RTP Headers for Low-Speed Serial Links, The Internet Society, Feb. 1999.*

(Continued)

*Primary Examiner*—Daniel J Ryman
*Assistant Examiner*—Cassandra Decker

(57) ABSTRACT

The invention relates to a system and a method for transmitting telegrams. The system has at least one first communication means provided for sending telegrams and at least one second communication means provided for receiving telegrams, with a telegram having a check value that can be determined from a useful data component of the telegram, with the first communication means having a first telegram counter provided for assigning a count value to a telegram in accordance with a send sequence. To improve error detection during the transmission of telegrams it is proposed that the count value for determining the check value be a constituent of the useful data component is, that information signaling a change in the count value be a constituent of the useful data component when the telegram is transmitted, that the second communication means have a second telegram counter, and that means be provided for synchronizing the first and second telegram counter.

14 Claims, 3 Drawing Sheets

U.S. PATENT DOCUMENTS

| | | | |
|---|---|---|---|
| 6,654,422 B1 * | 11/2003 | Khan et al. | 375/240.27 |
| 6,754,231 B1 * | 6/2004 | Jonsson et al. | 370/474 |
| 6,760,307 B2 * | 7/2004 | Dunning et al. | 370/231 |
| 6,882,637 B1 * | 4/2005 | Le et al. | 370/349 |
| 6,931,581 B1 * | 8/2005 | Cassiday et al. | 714/758 |
| 2002/0026620 A1 * | 2/2002 | Johansson et al. | 714/807 |
| 2004/0165527 A1 * | 8/2004 | Gu et al. | 370/229 |
| 2004/0218527 A1 * | 11/2004 | Schwartz | 370/230 |
| 2004/0230323 A1 | 11/2004 | Glanzer et al. | 700/18 |
| 2005/0041660 A1 * | 2/2005 | Pennec et al. | 370/389 |
| 2005/0232305 A1 * | 10/2005 | Lindemann | 370/489 |

FOREIGN PATENT DOCUMENTS

EP     1 261 184 A1     11/2002

OTHER PUBLICATIONS

T. Koren et al., RFC-3545: Enhanced Compressed RTP (CRTP) for Links with High Delay, Packet Loss and Reordering, The Internet Society, Jul. 2003.*

C. Bormann et al., RFC-3095: RObust Header Compression, Network Working Group, The Internet Society, Jul. 2001, pp. 125-128.*

* cited by examiner

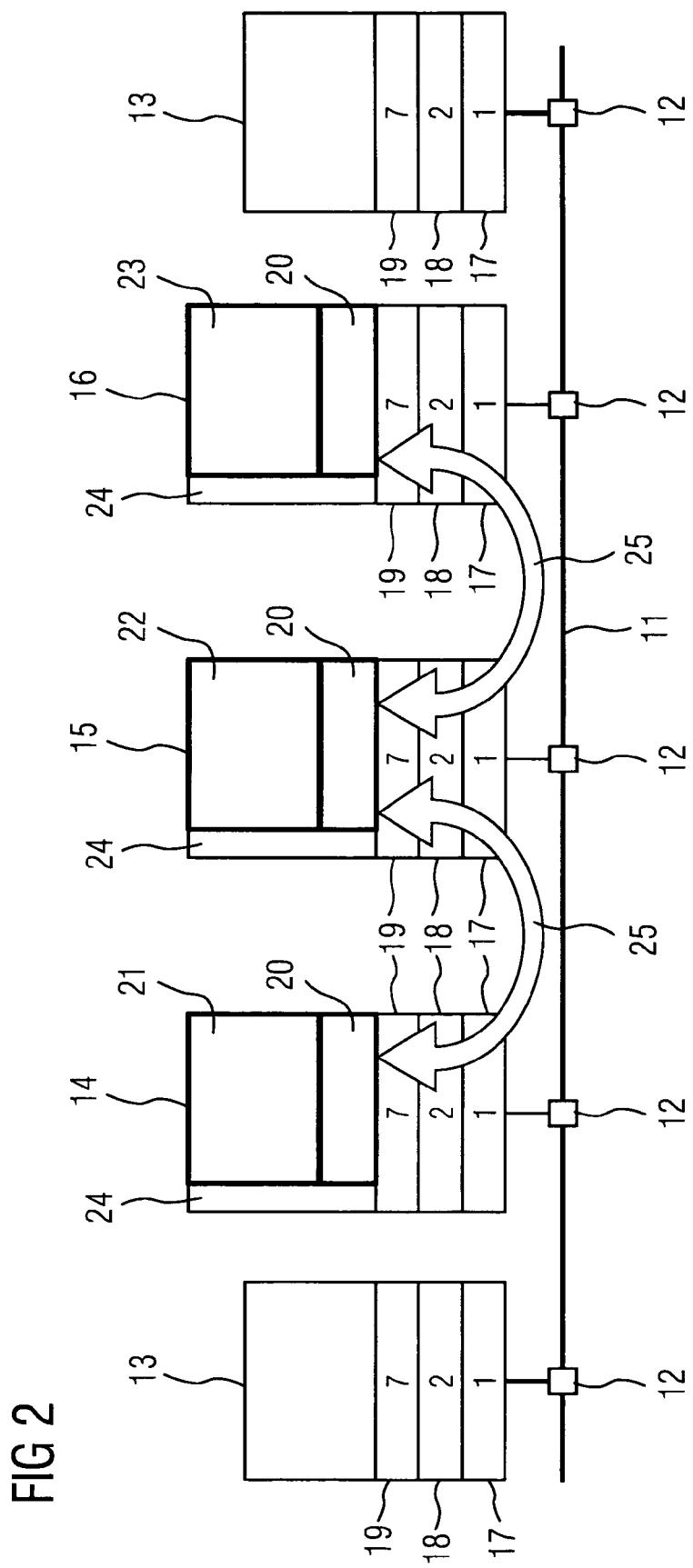

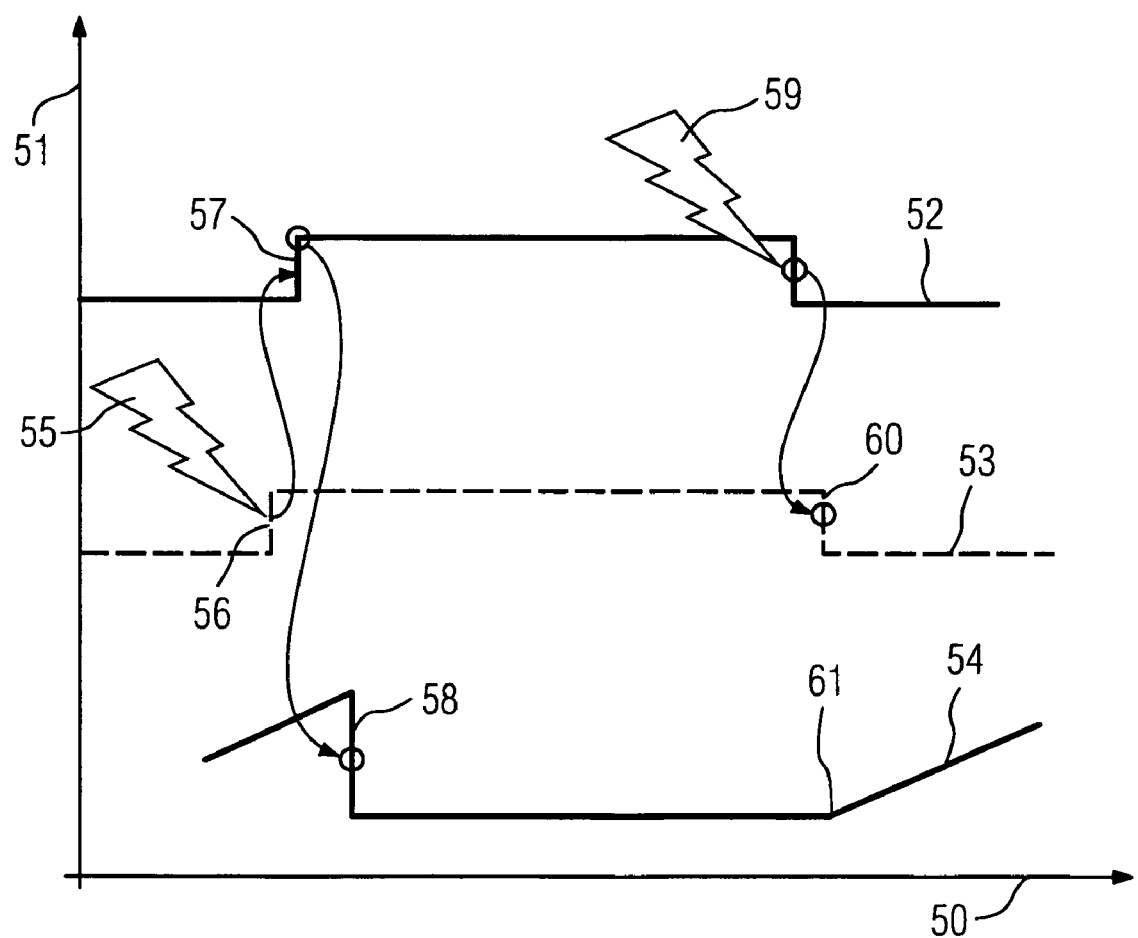

METHOD AND SYSTEM FOR TRANSMITTING TELEGRAMS

CROSS REFERENCE TO RELATED APPLICATIONS

This application claims priority to the European application No. 05001799.5, filed Jan. 28, 2005 which is incorporated by reference herein in its entirety.

FIELD OF INVENTION

The invention relates to a system and a method for transmitting telegrams. The system has at least one first communication means provided for sending telegrams and at least one second communication means provided for receiving telegrams, with a telegram having a check value that can be determined from a useful data component of the telegram. The first communication means has a first telegram counter provided for assigning a count value to a telegram in accordance with a send sequence. A telegram is a data packet that can be transmitted between communication means within the communication network.

BACKGROUND OF INVENTION

Using a check value serves to ensure data integrity during data transmission or storage, with a value, in the simplest case a checksum, being determined, for example calculated, from data in a telegram by means of a suitable method. The resulting value is then co-stored or, as the case may be, co-transmitted as a check value. The telegram recipient can likewise determine a check value from the data and compare said value with the sender's co-transmitted check value. If the two check values are different an error, in particular a transmission error, will have occurred. If the two check values are identical it is highly probable that the message will have been transmitted correctly.

SUMMARY OF INVENTION

An object of the invention is to improve error detection during the transmission of telegrams.

Said object is achieved by means of a system for transmitting telegrams having at least one first communication means provided for sending telegrams and at least one second communication means provided for receiving telegrams, with a telegram having a check value that can be determined from a useful data component of the telegram, with the first communication means having a first telegram counter provided for assigning a count value to a telegram in accordance with a send sequence, with the count value for determining the check value being a constituent of the useful data component, with information signaling a change in the count value being a constituent of the useful data component when the telegram is transmitted, with the second communication means having a second telegram counter, with means being provided for synchronizing the first and second telegram counter.

Said object is achieved by means of a method for transmitting telegrams between a first and second communication means by which method a check value is determined from a useful data component of a telegram, by means of a first telegram counter of the first communication means a count value is assigned to a telegram in accordance with a send sequence, with the count value for determining the check value being a constituent of the useful data component, with information signaling a change in the count value being transmitted as a constituent of the telegram's useful data component, with a second telegram counter of a second communication means being synchronized with the first telegram counter.

The invention is based on the idea of not transmitting the entire count value in the useful data component of the telegram but nonetheless using the count value in determining the check value. Instead of the entire count value only information signaling a change in said value is transmitted as a constituent of the telegram's useful data component. The probability of detecting errors while a telegram is being transmitted will be enhanced thereby without significantly reducing the respective telegram's useful data component. Distinguishing between the individual telegrams by means of a count value will thus be improved because a telegram counter having a count value with more places can be used without significantly restricting the useful data component of the data packets. A telegram counter is referred to also as a serial telegram number.

So that the useful data component can be used as effectively as possible for the actual useful data it is proposed according to an advantageous embodiment of the invention for the information signaling a change in the count value to be a signal edge.

So that the useful data component is minimally encumbered with the higher-value places of the count value it is proposed according to an advantageous embodiment of the invention for the count value to be divisible into higher-value places and at least one lower-value place and for the information signaling a change in the count value to be the at least one lower-value place. The higher-value places of the count value will thus not be transmitted in the telegram's useful data component, but said higher-value places will nonetheless be used in determining the check value. Of the count value only the at least one lower-value place will be transmitted as a constituent of the telegram's useful data component.

If, according to a further advantageous embodiment of the invention, the count value is a binary value, then the higher-value places will advantageously contain all the higher-value bits and the at least one lower-value place the lowest-value bit of the count value.

To increase certainty in detecting telegram errors, according to a further advantageous embodiment of the invention the check value can be determined by means of a cyclic redundancy check (CRC). Instead of simple addition, a CRC employs polynomal division for determining the check value and can generally detect random errors more effectively than a method based on a simple checksum.

To achieve particularly simple synchronizing between the first and second communication means it is proposed according to an advantageous embodiment of the invention for the means for synchronizing to be provided for transmitting resetting information between the communication means, with said resetting information being linked to resetting of the telegram counters to a resetting value.

The means for synchronizing are advantageously provided for transmitting the resetting information when communication starts and when a communication error occurs.

According to further advantageous embodiments of the invention the communication means are communication participants in a switched network or in a field bus system. The transmission of telegrams can be further improved if, according to an advantageous embodiment of the invention, the telegrams are at least partially storable in the communication means.

The system is advantageously provided for the failsafe transmission of telegrams, the term "failsafe" signifying that the system will go into a safe condition in the event of a disruption or fault. With a failsafe system, any faults occurring in the system (in this case faults that can arise in the communication means) must be detected with sufficiently high probability and managed, with the aim of adequately reducing the endangering of people, the environment and/or machinery by system faults.

BRIEF DESCRIPTION OF THE DRAWINGS

The invention is described in more detail below with the aid of the exemplary embodiments shown in the figures, in which:

FIG. 2 is a schematic of the various communication layers in a communication network, FIG. 5 shows the temporal flow of operations attending the occurrence of a communication error.

DETAILED DESCRIPTION OF INVENTION

The specific requirements of communication in failsafe systems are briefly dealt with below to explain the technical background of the invention. Especially in failsafe systems faults of any kind must be detected with high probability and managed in such a way as not to cause any impermissible reactions. In systems of said type that applies also to communication, for example over field buses. For field bus communication of said type, increasing use is also being made of Ethernet standards and Ethernet components. Such components include, for example, communication means embodied as switches. Very many (for example 100) switches can be arranged in series in field-bus communication. Said switches have the property of being able to store very many telegrams (1,000 or more). Should a fault occur in the switch (for example if an alpha particle causes a bit to invert), the switch may possibly resend telegrams it has already sent. The result thereof in failsafe systems can be that an actuator already deactivated through a telegram instruction will be reactivated (or vice versa) owing to the "old telegrams" sent again. This can thus lead to a hazardous fault that cannot be tolerated in failsafe systems.

Conventional field buses such as PROFIBUS and Interbus-S do not employ any switches for their communication. The communication means used being able to buffer just a few telegrams (typically two), it sufficed to manage a fault occasioning up to three old telegrams. Said conventional failsafe communication methods use a telegram counter having count values up to eight bits wide. With the aid of said telegram counter it is possible to detect a multiplicity of telegram errors such as, for example, the loss or duplication of a telegram, the insertion of an old telegram, and an incorrect telegram sequence.

Since, however, the probability of telegram duplications increases sharply with the introduction of switches and the structures that are possible therewith, and because the failsafe communication layer should give no credence to the error detection mechanisms of the standard communication layers, such a fault needs to be detected with very high probability. An 8-bit telegram counter will detect faults of this type with a probability of 1:255, which is customarily insufficient for safety applications. Residual error rates of 10-9 per hour are customarily required for failsafe communication that can be standardized. According to the exemplary embodiment a telegram counter having a 32-bit long count value is introduced. The additional 24 bits would reduce the possible amount of net data since a data packet—a telegram—is customarily limited in length, for example to 8 bytes in the case of a periphery with low-level modularity. The invention improves distinguishing between the individual telegrams by means of the telegram counter's respective count value without significantly restricting the data packets in terms of the portion of useful data.

Figure 1:
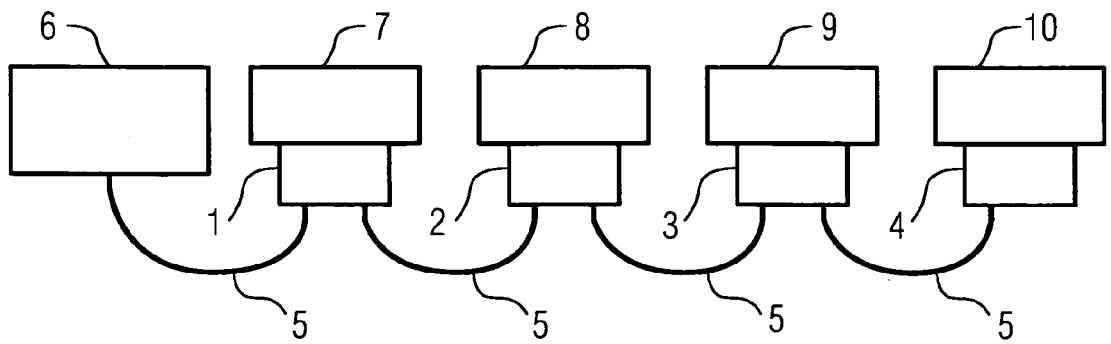
FIG. 1 shows a switched communication network having communication means.

FIG. 1 shows a communication system having communication means 1-4 provided in each case for sending and/or receiving telegrams. Communication means are referred to also as communication partners or communication participants. According to the exemplary embodiment the communication means are embodied as switches. These are connected via point-to-point connections 5 to each other and to a failsafe stored-program control 6. Said stored-program control 6 likewise has communication means. The communication means 1-4 serve as a communication interface to failsafe sensors 7, 8, and 9 or, as the case may be, failsafe actuators 10 and can be integrated therein.

FIG. 2 illustrates failsafe communication with the aid of what is termed the layer model, based in this case on the ISO/OSI layer model. A layer model describes in the form of logical closed layers how communication in a network is structured. In this case the communication model has seven layers for non failsafe communication of which three layers are shown by way of example in FIG. 2. Said non-failsafe layers 17, 18, and 19, for which the term black channel is also used, contain non-failsafe components such as, for example, ASICs, links, cables, etc. The two lowest layers 17, 18 are shown as well as the top layer 19 of non-failsafe communication. Underlayed non-failsafe communication has the means necessary for providing the availability required within the respective application. That is to say the non-failsafe layers ensure the respectively required availability of communication. The requisite safety (for example a residual-error rate of <10-9/hour) is achieved in the failsafe communication layer 20, referred to also as the Safety Layer, which is structured redundantly, for instance. That is to say the additional characteristics required for a high degree of safety are provided here by the Safety Layer, for example Profisafe. The Safety Layer makes failsafe functions available, for example in terms of addressing, watchdog timers, sequencing, signing, etc. According to the exemplary embodiment shown in FIG. 2 the communication means are embodied as being part of standard input/output modules 13 and of a failsafe input module 14, a failsafe control 15, and a failsafe output module 16. The communication means communicate via point-to-point connections 11 and via switches 12 connected thereby. Failsafe communication is symbolized by the arrows 25. Failsafe applications 21-23 build on the failsafe communication layer 20 although they are not themselves part of its profile. Functions 24 that are not relevant to the failsafe functions build directly on the non-failsafe communication layers 17-19. Non-failsafe functions of this type relate to, for example, diagnosis. The failsafe communication layer 20 realizes the failsafe functions such as determining the check value, telegram counter, and synchronizing that are explained in the following.

Figure 3:
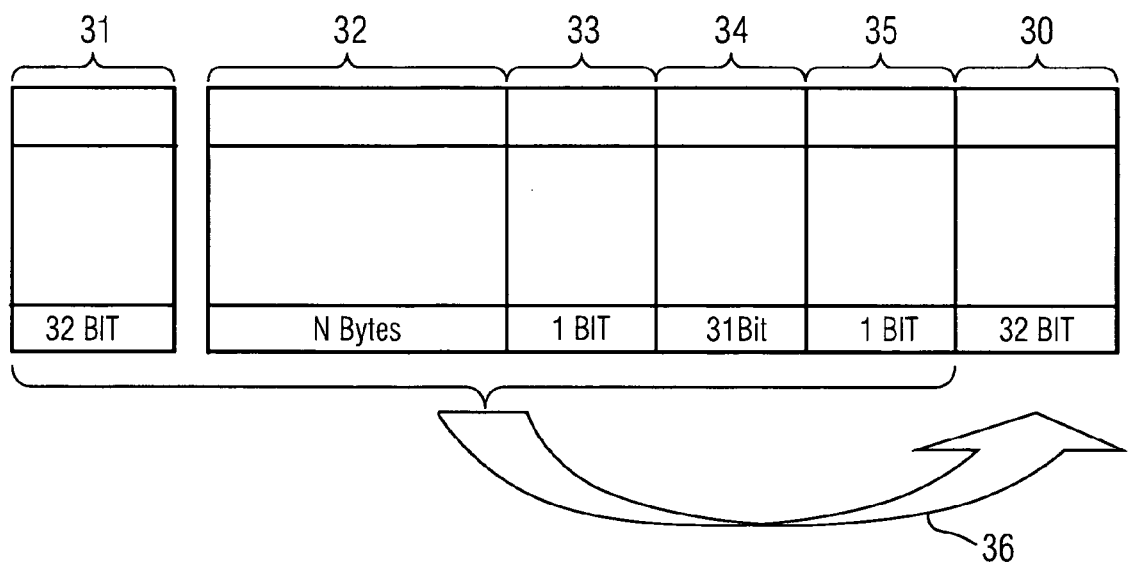
FIG. 3 shows the calculation of a check value.

FIG. 3 illustrates determining of a check value according to an exemplary embodiment of the invention. Failsafe communication methods safeguard the data transmitted in telegrams by means customarily of a check value such as, for example, CRC. According to the exemplary embodiment of the invention the higher-value bits of the telegram counter's count value are not transmitted in the useful data, referred to also as net data, but are made known to the communication partner in another way, or, as the case may be, said communication partner is synchronized with the new counter status. Said higher-value bits are furthermore included in the check value. Fault detection is increased thereby in the exemplary instance of Profisafe from 28 by a factor of 224 without reducing the net data in the telegrams. The telegram counter can be synchronized as follows. When communication starts it is set to zero and is reset again each time a communication error occurs. One of the two communication partners may fail to pick up that the other has detected a communication error. The data transmitted by the sender therefore has to include resetting information indicating that it has reset the counter. Two bits will suffice to maintain a telegram counter of any bit length when this method is applied: One bit which, as information signaling a change in the count value, changes its status with each increment in the telegram counter's count value, and one bit which, as resetting information, indicates the counter reset. To detect telegram duplications, the entire count value is included in the check value. Although with this method it will in many cases not be possible to distinguish between the presence of a "CRC error" and an error in the count value, such a distinction is not necessary with failsafe applications. What matters is that the system has detected the occurrence of an error so it can initiate the failsafe fault response. The 32-bit check value requiring to be determined is here designated by the reference numeral 30. The process of determining the check value is indicated by the arrow 36. The telegram counter has a count value 32 bits wide. The probability that in the event of an error an old telegram sent again will have exactly the matching next counter status of the telegram actually requiring to be sent will thus be very low (for a 32-bit counter: 2-32). When the check value 30 is being determined an initial value 31 will be taken into account for the check value that is likewise 32 bits wide. The failsafe data 32 having the requisite length, one bit as resetting information 33 indicating resetting of the telegram counter, the 31 higher-value bits of the count value, designated by the reference numeral 34, and the lowest-value bit of the count value, designated by the reference numeral 35, are also taken into account in determining the check value 30. This method (virtual counter) is advantageously also applied to data acknowledgment. The sender will hereby know with a high degree of certainty that the recipient has received the data sent.

Figure 4:
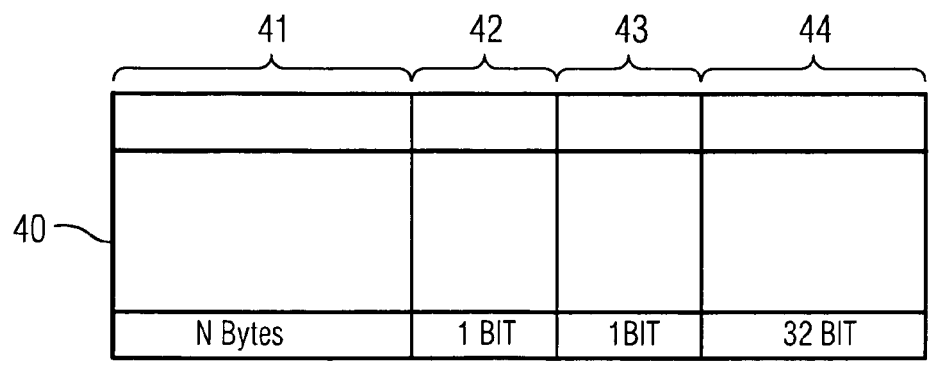
FIG. 4 shows a component of a telegram.

FIG. 4 shows the failsafe component of the telegram transmitted between the communication means over the communication network. Said failsafe component 40 is generated and processed in the failsafe communication layer, for example the communication layer 20 according to FIG. 2. The underlayed non-failsafe communication layers will, where applicable, add further non-failsafe information to said failsafe component 40 (onion principle). The telegram component 40 consists of the failsafe data 41 of the requisite length, bit 42 indicating resetting of the telegram counter, the lowest-value bit of the count value, designated by the reference numeral 43, and the failsafe check value 44 having 32 bits.

FIG. 5 shows the flow of operations during or, as the case may be, after the occurrence of a communication error in an exemplary embodiment of the system according to the invention as well as synchronizing of the telegram counters. The time axis is designated by the reference numeral 50 and the value axis by the reference numeral 51. What is shown are the temporal curves of the reset bit 52, of a signal 53 indicating the status of the output signals, and of the telegram counter's count value 54. The reset bit 52 is a check bit which the sender sends the recipient cyclically. The reset bit 52 corresponds to the resetting information 33. The count value 54 will remain at zero or, as the case may be, its start value for as long as said reset bit 52 has the value one. The signal 53 indicates the status of the output signals: If the signal 53 is one, failsafe values will be fed out; if the signal 53 is zero, process values will be fed out. The occurrence of an error is symbolized by the arrow having the reference numeral 55. In the event of an error the signal 53 will be set to one (reference numeral 56) by the failsafe control—what is termed the F-Host (F=failsafe)—and by the failsafe slaves (F-Slaves) connected to said control because the data recipient can no longer rely on the validity of the communication data. In this case it is no longer process data that will be transmitted but what is termed failsafe data, referred to also as failsafe values. This will result directly in setting of the reset bit 52, indicated by the reference numeral 57, then to resetting 58 of the count value 54 to the value zero or, as the case may be, the start value. Resetting 60 of the signal 53, and hence renewed release of process data transmission, as well as renewed release 61 of the telegram counter's count value 54 will not take place until after an acknowledgement 59.

Summarizing, the invention thus relates to a system and a method for transmitting telegrams. The system has at least one first communication means 1 provided for sending telegrams and at least one second communication means 2 provided for receiving telegrams, with a telegram having a check value 30 that can be determined from a useful data component 32-35 of the telegram, with the first communication means 1 having a first telegram counter provided for assigning a count value 34, 35 to a telegram in accordance with a send sequence. To improve error detection during the transmission of telegrams it is proposed that the count value 34, 35 for determining the check value 30 be a constituent of the useful data component 32-35, that information signaling a change in the count value be a constituent of the useful data component when the telegram is transmitted, that the second communication means 2 have a second telegram counter, and that means be provided for synchronizing the first and second telegram counter.

The invention claimed is:
1. A system for transmitting telegrams, comprising:
at least one first communication device comprising a first counter for sending a telegram;
at least one second communication device comprising a second counter for receiving the telegram, wherein the first and second counters comprise a count value which is reset to a reset value upon the start of a transmission sequence between the at least one first and the at least one second communication devices, the count value represented as a plurality of bits comprising higher bits and a lowest bit;
wherein the at least one first communication device is adapted to construct and transmit the telegram having process data and a failsafe component, the failsafe component having
(a) a first data section comprising failsafe data;
(b) a second data section comprising a reset bit having two possible values wherein the reset bit is set to a first value upon the start of the transmission sequence and wherein if an error is detected the reset bit is set to a second value, and wherein if an acknowledgement is received the reset bit is set to the first value;
(c) a third data section comprising a count bit having two possible values representing the lowest bit of the count value which toggles upon each increment of the count value in accordance with the transmission sequence; and
(d) a fourth section comprising a check value used in error detection;

wherein the at least one first communication device increments the count value if the reset bit is set to the first value and resets the count value to the reset value if the reset bit has been set to the first value after having been set to the second value; and wherein the at least one second communication device is adapted to receive the telegram and if the reset bit equals the first value, read the process data of the telegram and increment the count value; and if the reset bit equals the second value, read the failsafe data of the telegram and reset the count value to the reset value.

2. The system according to claim 1, wherein the check value is constructed from a combination of an initial value, the failsafe data, the reset bit, and the count value.

3. The system according to claim 1, wherein the check value is determined by a cyclic redundancy check procedure.

4. The system according to claim 1, wherein the value is selected from the group consisting of zero and a start value.

5. The system according with claim 1, wherein the first and second communication devices are part of a switched network.

6. The system according to claim 1, wherein the first and second communication devices are part of a field bus system.

7. The system according to claim 1, wherein each of the first and second communication devices includes a memory for storing at least part of the telegram.

8. A method for transmitting a telegram between a first communication device comprising a first counter and a second communication device comprising a second counter, the method comprising:
(a) synchronizing a count value for both the first and second counters to a reset value upon the start of a transmission sequence between the first and second communication devices, the count value represented as a plurality of bits comprising higher bits and a lowest bit;
(b) constructing a telegram having process data and a failsafe component, the failsafe component having a first data section comprising failsafe data, a second data section comprising a reset bit having two possible values wherein the reset bit is set to a first value upon the start of the transmission sequence, a third data section comprising a count bit having two possible values representing the lowest bit of the count value which toggles upon each increment of the count value in accordance with the transmission sequence, and a fourth section comprising a check value used in error detection;
(c) transmitting the telegram comprising the failsafe component and the process data from the first communication device to the second communication device, wherein if an error is detected, setting the reset bit to a second value, and wherein if an acknowledgement is received, setting the reset bit to the first value, and incrementing the count value if the reset bit is set to the first value and resetting the count value to the reset value if the reset bit has been set to the first value after having been set to the second value; wherein
(1) if the reset bit equals the first value, reading the process data of the telegram by the second communication device and incrementing the count value and returning to step (b); and
(2) if the reset bit equals the second value, reading the failsafe data of the telegram by the second communication device, resetting the count value to the reset value and returning to step (b).

9. The method according to claim 8, wherein the check value is constructed from a combination of an initial value, the failsafe data, the reset bit, and the count value.

10. The method according to claim 8, wherein the check value is determined by a cyclic redundancy check procedure.

11. The method according to claim 8, wherein the reset value for the first and second counters is selected from the group consisting of zero and a start value.

12. The method according to claim 8, wherein the first and second communication devices are part of a switched network.

13. The method according to claim 8, wherein the first and second communication devices are part of a field-bus system.

14. The method according to claim 8, wherein each of the first and second communication devices include a memory for storing at least part of the telegram.

* * * * *